(12) United States Patent
Lee et al.

(10) Patent No.: US 11,380,889 B2
(45) Date of Patent: Jul. 5, 2022

(54) ELECTRODE AND A RECHARGEABLE LITHIUM BATTERY INCLUDING THE ELECTRODE

(71) Applicant: SAMSUNG SDI CO., LTD., Yongin-si (KR)

(72) Inventors: Kyuseo Lee, Yongin-si (KR); Heeeun Yoo, Yongin-si (KR); Yeonhee Yoon, Yongin-si (KR); Jaehwan Ha, Yongin-si (KR); Kijun Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 158 days.

(21) Appl. No.: 16/711,114

(22) Filed: Dec. 11, 2019

(65) Prior Publication Data

US 2020/0194784 A1      Jun. 18, 2020

(30) Foreign Application Priority Data

Dec. 12, 2018   (KR) .................. 10-2018-0160080

(51) Int. Cl.
*H01M 4/36* (2006.01)
*H01M 4/62* (2006.01)
(Continued)

(52) U.S. Cl.
CPC ........... *H01M 4/366* (2013.01); *H01M 4/525* (2013.01); *H01M 4/587* (2013.01); *H01M 4/62* (2013.01);
(Continued)

(58) Field of Classification Search
CPC ......... H01M 10/0525; H01M 10/4235; H01M 2200/10; H01M 4/131; H01M 4/133;
(Continued)

(56) References Cited

U.S. PATENT DOCUMENTS 5,582,931 A   12/1996   Kawakami
6,465,125 B1  10/2002   Takami et al.
(Continued)

FOREIGN PATENT DOCUMENTS

CN   1246736   3/2000
CN   1286507   3/2001
(Continued)

OTHER PUBLICATIONS

EPO Extended Search Report dated Nov. 7, 2019, for corresponding European Patent Application No. 19183958.8, (7 pages).
(Continued)

*Primary Examiner* — Carlos Barcena
(74) *Attorney, Agent, or Firm* — H.C. Park & Associates, PLC

(57) ABSTRACT

Disclosed are an electrode for a rechargeable lithium battery and a rechargeable lithium battery. The electrode includes a current collector, a first active material layer, and a second active material layer. The first active material layer is formed on the current collector and includes a first active material. The second active material layer is formed on the first active material layer. The second active material layer includes a second active material having an active material and a meltdown polymer disposed on the surface of the active material.

16 Claims, 7 Drawing Sheets

(51) Int. Cl.
  *H01M 4/525* (2010.01)
  *H01M 4/587* (2010.01)
  *H01M 10/0525* (2010.01)
  *H01M 50/581* (2021.01)

(52) U.S. Cl.
  CPC ..... *H01M 10/0525* (2013.01); *H01M 50/581* (2021.01); *H01M 2200/10* (2013.01)

(58) Field of Classification Search
  CPC ...... H01M 4/366; H01M 4/525; H01M 4/587; H01M 4/62; H01M 50/581
  See application file for complete search history.

(56) References Cited

U.S. PATENT DOCUMENTS

| | | | |
|---|---|---|---|
| 6,475,678 | B1 | 11/2002 | Isao |
| 6,511,517 | B1 | 1/2003 | Ullrich et al. |
| 6,511,776 | B1 | 1/2003 | Ryuji et al. |
| 10,476,082 | B2 | 11/2019 | Jang et al. |
| 10,756,352 | B2 | 8/2020 | Yoon et al. |
| 2002/0004169 | A1 | 1/2002 | Yamada et al. |
| 2005/0079422 | A1 | 4/2005 | Ko et al. |
| 2005/0221165 | A1 | 10/2005 | Hennige et al. |
| 2006/0099495 | A1 | 5/2006 | Suzuki et al. |
| 2007/0057228 | A1 | 3/2007 | Huang et al. |
| 2007/0264577 | A1 | 11/2007 | Katayama et al. |
| 2008/0292965 | A1 | 11/2008 | Kubota et al. |
| 2009/0067119 | A1 | 3/2009 | Katayama et al. |
| 2009/0253043 | A1 | 10/2009 | Bak |
| 2010/0248026 | A1* | 9/2010 | Hinoki .................... H01M 4/62 429/209 |
| 2011/0003209 | A1 | 1/2011 | Katayama et al. |
| 2011/0062378 | A1 | 3/2011 | Chang et al. |
| 2012/0321948 | A1 | 12/2012 | Oya et al. |
| 2013/0089794 | A1 | 4/2013 | Kim et al. |
| 2014/0014027 | A1 | 1/2014 | Bischoff et al. |
| 2014/0272489 | A1 | 9/2014 | Anandan et al. |
| 2014/0322600 | A1 | 10/2014 | Morita et al. |
| 2015/0050533 | A1 | 2/2015 | Nam et al. |
| 2015/0221452 | A1 | 8/2015 | Iida et al. |
| 2016/0104880 | A1 | 4/2016 | Gao et al. |
| 2016/0141579 | A1 | 5/2016 | Seok et al. |
| 2016/0268558 | A1 | 9/2016 | Sawayama et al. |
| 2016/0285101 | A1* | 9/2016 | Yoshio ................ H01M 10/425 |
| 2016/0351885 | A1 | 12/2016 | Umehara |
| 2017/0170481 | A1 | 6/2017 | Jang et al. |
| 2017/0229731 | A1 | 8/2017 | Visco et al. |
| 2018/0040899 | A1 | 2/2018 | Kuzuoka et al. |
| 2018/0083312 | A1 | 3/2018 | Shiu et al. |
| 2018/0097218 | A1 | 4/2018 | Komura |
| 2018/0145333 | A1 | 5/2018 | Tokune et al. |
| 2018/0191027 | A1 | 7/2018 | Ohara et al. |
| 2018/0294516 | A1 | 10/2018 | Huang et al. |
| 2018/0331342 | A1 | 11/2018 | Honda et al. |
| 2018/0375158 | A1 | 12/2018 | Morinaka et al. |
| 2019/0140283 | A1 | 5/2019 | Fukatani et al. |
| 2019/0229325 | A1 | 7/2019 | Ahn et al. |
| 2019/0334157 | A1 | 10/2019 | Seok et al. |
| 2019/0355952 | A1 | 11/2019 | Yoon et al. |
| 2019/0383465 | A1 | 12/2019 | Van Der et al. |
| 2020/0014027 | A1 | 1/2020 | Ha et al. |
| 2020/0014078 | A1 | 1/2020 | Ha et al. |
| 2020/0075955 | A1 | 3/2020 | Jeon et al. |
| 2020/0127257 | A1 | 4/2020 | Lee et al. |
| 2020/0350557 | A1 | 11/2020 | Ha et al. |
| 2020/0350566 | A1 | 11/2020 | Ha et al. |
| 2020/0350567 | A1 | 11/2020 | Ha et al. |
| 2020/0350568 | A1 | 11/2020 | Lee et al. |
| 2020/0350574 | A1 | 11/2020 | Ha et al. |
| 2020/0350580 | A1 | 11/2020 | Ha et al. |
| 2020/0350632 | A1 | 11/2020 | Ha et al. |
| 2021/0074967 | A1 | 3/2021 | Kim et al. |
| 2021/0074971 | A1 | 3/2021 | Kim et al. |
| 2021/0074972 | A1 | 3/2021 | Kim et al. |
| 2021/0074975 | A1 | 3/2021 | Kwak et al. |
| 2021/0074979 | A1 | 3/2021 | Kwak et al. |
| 2021/0074980 | A1 | 3/2021 | Kim et al. |

FOREIGN PATENT DOCUMENTS

| | | | |
|---|---|---|---|
| CN | 101048892 | 10/2007 | |
| CN | 101847709 | 9/2010 | |
| CN | 101478042 | 12/2010 | |
| CN | 102280614 | 12/2011 | |
| CN | 105977447 A * | 9/2016 | ............ H01M 4/133 |
| CN | 106848383 | 6/2017 | |
| CN | 111883815 | 11/2020 | |
| CN | 111883816 | 11/2020 | |
| CN | 111883819 | 11/2020 | |
| EP | 1079455 | 2/2001 | |
| EP | 1826842 | 8/2007 | |
| EP | 2581977 | 4/2013 | |
| EP | 2838142 | 2/2015 | |
| EP | 2874215 | 5/2015 | |
| EP | 3024063 | 5/2016 | |
| EP | 3386003 | 10/2018 | |
| JP | 2000-277148 | 10/2000 | |
| JP | 2001-135359 | 5/2001 | |
| JP | 2004-111157 | 4/2004 | |
| JP | 2005-123185 | 5/2005 | |
| JP | 2008-305783 | 12/2008 | |
| JP | 4977079 | 7/2012 | |
| JP | 2012-221672 | 11/2012 | |
| JP | 2015115168 | 6/2015 | |
| JP | 2018-106879 | 7/2018 | |
| JP | 2018-147672 | 9/2018 | |
| JP | 2018-156876 | 10/2018 | |
| JP | 2019-087464 | 6/2019 | |
| KR | 10-2005-0035074 | 4/2005 | |
| KR | 10-2005-0035281 | 4/2005 | |
| KR | 10-2008-0073371 | 8/2008 | |
| KR | 10-2009-0106841 | 10/2009 | |
| KR | 10-2010-0081950 | 7/2010 | |
| KR | 10-2015-0020022 | 2/2015 | |
| KR | 10-2015-0129181 | 11/2015 | |
| KR | 10-2016-0024776 | 3/2016 | |
| KR | 10-2016-0025052 | 3/2016 | |
| KR | 10-2016-0029176 | 3/2016 | |
| KR | 10-2016-0110076 | 9/2016 | |
| KR | 10-2016-0117689 | 10/2016 | |
| KR | 10-2017-0060515 | 6/2017 | |
| KR | 10-2017-0094720 | 8/2017 | |
| KR | 10-2017-0109285 | 9/2017 | |
| KR | 10-2017-0113645 | 10/2017 | |
| KR | 10-2018-0014192 | 2/2018 | |
| KR | 10-2018-0037121 | 4/2018 | |
| KR | 10-2018-0045724 | 5/2018 | |
| KR | 10-2018-0049986 | 5/2018 | |
| KR | 10-2018-0077190 | 7/2018 | |
| KR | 10-2018-0081072 | 7/2018 | |
| KR | 10-2018-0097036 | 8/2018 | |
| KR | 10-2020-0044579 | 4/2020 | |
| WO | 2006-132474 | 12/2006 | |
| WO | 2014103792 | 7/2014 | |
| WO | 2018-012821 | 1/2018 | |

OTHER PUBLICATIONS

EPO Extended Search Report dated Nov. 7, 2019, corresponding to European Patent Application No. 19183919.0, (7 pages).
Extended European Search Report dated Aug. 3, 2020, issued to European Patent Application No. 20171859.0.
Extended European Search Report dated Aug. 3, 2020, issued to European Patent Application No. 20171551.3.
Extended European Search Report dated Aug. 3, 2020, issued to European Patent Application No. 20171450.8.
Extended European Search Report dated Aug. 3, 2020, issued to European Patent Application No. 20171833.5.
Extended European Search Report dated Aug. 3, 2020, issued to European Patent Application No. 20171846.7.
Extended European Search Report dated Aug. 3, 2020, issued to European Patent Application No. 20172132.1.

(56) References Cited

OTHER PUBLICATIONS

Extended European Search Report dated Oct. 19, 2020, issued to European U.S. Appl. No. 20/172,161.
U.S. Appl. No. 16/862,638.
U.S. Appl. No. 16/862,779.
U.S. Appl. No. 16/862,866.
U.S. Appl. No. 16/863,679.
U.S. Appl. No. 16/864,294.
U.S. Appl. No. 16/864,384.
U.S. Appl. No. 16/864,858.
U.S. Appl. No. 16/460,779.
Notice of Refusal dated Mar. 11, 2021, issued to Korean Patent Application No. 10-2018-0160080.
Grant of Patent dated Mar. 25, 2021, issued to Korean Patent Application No. 10-2018-0077138.
Grant of Patent dated Mar. 25, 2021, issued to Korean Patent Application No. 10-2018-0077139.
Office Action dated Apr. 12, 2021, issued to U.S. Appl. No. 16/460,779.
Extended European Search Report dated Nov. 7, 2019, in European Patent Application No. 19183958.8.
Extended European Search Report dated Nov. 7, 2019, in European Patent Application No. 19183919.0.
U.S. Appl. No. 16/460,765.
Office Action dated Mar. 4, 2021, issued to U.S. Appl. No. 16/460,765.
Notice of Allowance dated Sep. 2, 2021, issued to Korean Patent Application No. 10-2018-0160080.
Office Action dated Sep. 10, 2021, issued to U.S. Appl. No. 16/460,765.
Final Office Action dated Oct. 22, 2021, issued to U.S. Appl. No. 16/460,779.
Advisory Action dated Nov. 17, 2021, issued to U.S. Appl. No. 16/460,765.
Office Action dated Nov. 29, 2021, issued to European Patent Application No. 19183919.0.
Advisory Action and AFCP Decision dated Jan. 6, 2022 issued to U.S. Appl. No. 16/460,779.
Office Action dated Jan. 26, 2022 and Search Reported dated Jan. 21, 2022, issued to Chinese Patent Application No. 201901595050.
Office Action and Search Report dated Feb. 9, 2022, issued to Chinese Patent Application No. 201910594666.
Office Action dated Feb. 17, 2022, issued to U.S. Appl. No. 16/862,779.
Office Action dated Feb. 17, 2022, issued to U.S. Appl. No. 16/460,765.
Non-Final Office Action dated Mar. 28, 2022, issued to U.S. Appl. No. 16/863,679.
Non-Final Office Action dated Apr. 1, 2022, issued to U.S. Appl. No. 16/864,384.
Non-Final Office Action dated Apr. 27, 2022, issued to U.S. Appl. No. 16/862,638.
Non-Final Office Action dated May 3, 2022, issued to U.S. Appl. No. 16/864,294.
Non-Final Office Action dated May 12, 2022, issued to U.S. Appl. No. 16/862,866.

* cited by examiner

ELECTRODE AND A RECHARGEABLE LITHIUM BATTERY INCLUDING THE ELECTRODE

CROSS-REFERENCE TO RELATED APPLICATION

This application claims priority from and the benefit of Korean Patent Application No. 10-2018-0160080, filed on Dec. 12, 2018, which is hereby incorporated by reference for all purposes as if fully set forth herein.

BACKGROUND

Field

The present disclosure relates to an electrode for a rechargeable lithium battery and a rechargeable lithium battery including the electrode.

DISCUSSION OF THE BACKGROUND

Rechargeable lithium batteries are attracting attention as power sources for various electronic devices because of high discharge voltage and high energy density. Usually, a rechargeable lithium battery includes a positive or negative active material as well as an electrolyte. As for positive active materials of rechargeable lithium batteries, a lithium-transition metal oxide having a structure capable of intercalating lithium ions such as $LiCoO_2$, $LiMn_2O_4$, and $LiNi_{1-x}Co_xO_2$ ($0<x<1$) have been used. As for negative active materials of rechargeable lithium batteries, various carbon-based materials such as artificial graphite, natural graphite, and hard carbon capable of intercalating and deintercalating lithium ions have been used. As for electrolytes of rechargeable lithium batteries, an organic solvent in which a lithium salt is dissolved has been used.

However, there has been a shortcoming in some rechargeable lithium batteries due to excessive heat generation during charging and recharging. Such excessive heat can lead to hazards and safety concerns. There is desire to provide a mechanism for minimizing dangers associated with excessive heat generation.

The above information disclosed in this Background section is only for understanding of the background of the inventive concepts, and, therefore, it may contain information that does not constitute prior art.

SUMMARY

One exemplary embodiment is an electrode for a rechargeable lithium battery. The electrode includes a current collector, a first active material layer, and a second active material layer. The first active material layer is formed on the current collector and includes a first active material. The second active material layer is formed on the first active material layer. The second active material layer includes a second active material having an active material and a meltdown polymer disposed on the surface of the active material.

Additional features of the inventive concepts will be set forth in the description which follows, and in part will be apparent from the description, or may be learned by practice of the inventive concepts.

An embodiment provides an electrode for a rechargeable lithium battery that has an improved lithium utilization rate during charge and discharge and provides improved safety. Another embodiment provides a rechargeable lithium battery including the electrode.

According to an embodiment, an electrode for a rechargeable lithium battery includes a current collector; a first active material layer formed on the current collector and including a first active material; and a second active material layer formed on the first active material layer. Typically, the second active material layer includes a second active material including an active material and a meltdown polymer disposed on the surface of the active material. At least a portion of the surface of the active material may not be in contact with the meltdown polymer. The meltdown polymer may be disposed in lumps on the surface of the active material. Alternatively, the meltdown polymer may be disposed in particle shapes, or spines attached to the surface of the active material. The meltdown polymer may be polyethylene, polypropylene, polymethylmethacrylate, poly(1-butene), polyimide, or a combination thereof. The meltdown polymer may be present in an amount of about 0.1 wt % to about 5.5 wt % based on a total weight of the second active material. The meltdown polymer may be attached to the surface of the second active material via a binder.

The meltdown polymer may have a particle shape and a size of the meltdown polymer may be about 1 μm to about 10 μm. The meltdown polymer may have a needle shape and a length of the meltdown polymer may be about 0.5 μm to about 10 μm.

The meltdown polymer may be disposed on the surface of the active material with a collective surface area of about 0.1% to about 80% relative to 100% of the surface area of the active material.

A thickness of the second active material layer may be about 2 μm to about 8 μm. In addition, a thickness of the second active material layer may be about 0.1% to about 30% relative to 100% of the entire thickness of the first active material layer and the second active material layer. The electrode may be a positive electrode or a negative electrode, according to an embodiment, a negative electrode. Another embodiment provides a rechargeable lithium battery including a first electrode which is the embodied electrode; a second electrode; and an electrolyte. Specific details of other embodiments are included in the detailed description below.

The electrode for a rechargeable lithium battery according to an embodiment may provide a rechargeable lithium battery exhibiting improved lithium ion efficiency and improved safety. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
FIG. 1 is a side, elevational view showing an electrode for a rechargeable lithium battery according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "first active material", "second active material", "active material", and "intercalation substance" include at least one compound that intercalates and deintercalates ions typically during charging and discharging of a battery. Furthermore, a second active material may include an active material or an intercalation substance, and the terms "active material" and "intercalation substance" may be used interchangeably.

As used herein, the term "meltdown polymer" means a polymer that melts to short circuit a battery if a battery overheats. Typically, a meltdown polymer melts at about 110° C. to about 140° C.

As used herein, the term "aspect ratio" means the ratio of the longest dimension divided by the shortest dimension of a particle. As an example, the aspect ratio could be the length divided by the thickness of a particle.

As used herein, the term "spherical" encompasses other generally spherical shapes, such as a prolate spheroid and an oblate spheroid, in addition to circular spheres.

As used herein, the term "weight percent" may be abbreviated "wt %".

As used herein, IUPAC nomenclature may used to refer to polymers, such as polyethylene may be referred to as polyethene, polypropylene may be referred to as polypropene, and poly(methyl methacrylate) may be referred to as poly(methyl 2-methylpropenoate). Poly(1-butene) may be referred to as polybutene-1 and a polyimide is a polymer that has an imide group in the polymer chain, such as a polymer including imide monomers.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

An embodiment provides an electrode for a rechargeable lithium battery including a current collector; a first active material layer disposed on the current collector and including a first active material; and a second active material layer disposed on the first active material layer wherein the second active material layer includes a second active material including an active material and a meltdown polymer disposed on the surface of the active material.

The electrode 1 for a rechargeable lithium battery according to an embodiment includes a current collector 3, a first active material layer 5 having a thickness $T_1$ formed on the current collector 3, and a second active material layer 7 having a thickness $T_2$ disposed on the first active material layer 5 as shown in FIG. 1. The entire thickness of the first active material layer 5 and second active material layer 7 is represented by $T_{SUM}$.

The first active material layer 5 includes the first active material, and the second active material layer 7 includes the second active material including the active material or intercalation substance and the meltdown polymer disposed on the active material surface. The intercalation substance or active material is the same or different from the first active material. At least a portion of the surface of the active material may not be in contact with the meltdown polymer. According to an embodiment, the meltdown polymer may be disposed in a cluster of lumps on the surface of the active material. In addition, the meltdown polymer may have particle shapes, or form a plurality of spines attached to the spherical surface of the active material.

Figure 2A:
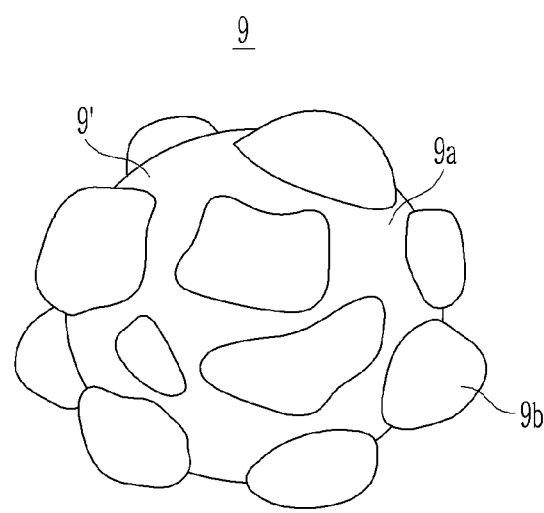
FIG. 2A is a side, elevational view showing a second active material with meltdown polymer lumps according to an exemplary embodiment.
Figure 2B:
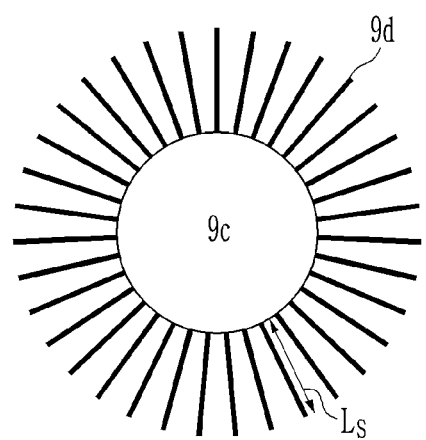
FIG. 2B is a cross-sectional, elevational view showing a second spherical active material with meltdown polymer spines according to another exemplary embodiment.

According to an embodiment, as shown in FIG. 2A, the second active material 9 may include the meltdown polymer that is disposed in a cluster of particle-shaped lumps 9b on the surface 9a of the active material 9'. According to another embodiment, as shown in FIG. 2B, the second active material 9 may include the meltdown polymer that is in needle shapes or spines 9d and is attached on the surface of the active material 9c to form a spiny sphere. In other words, the needle-shaped meltdown polymer 9d forms separate spines 9d radiating outwardly from the surface of the active material 9c. Each spine 9d may, independently, have a length $L_s$.

As such, the meltdown polymer may be discontinuously disposed in lumps on the active material and may be, for example, present in a form of particle shapes, or spines. In this way, when the meltdown polymer is disposed in lumps, as the portion of the surface of the active material is exposed, lithium ions may efficiently move from the active material during the charge and discharge, and accordingly, an improved lithium ion utilization rate may be obtained. When the meltdown polymer is continuously disposed in a layer-type on the surface of the active material, that is, substantially completely covers the surface of the active material, the lithium ion movement is suppressed during the charge and discharge and resultantly, the charge and discharge does not occur. Or, even when the meltdown polymer forms a polymer layer covering the active material layer, the lithium ion movement is suppressed during the charge and discharge.

In addition, when heat is generated in the electrode inside a battery having the meltdown polymer during charging and discharging, applying a physical impact to the battery, or penetrating the battery to create a thermal runaway, the meltdown polymer melts down first before shutdown of the separator and thus covers the overall surface of the active material and suppresses the lithium ion movement, thereby stopping the charge and discharge and accordingly, creating a short circuit of the battery to secure safety.

In addition, the meltdown polymer is not included in the first active material layer and is included only in the second active material layer. Accordingly, the second active material layer only includes the second active material having the meltdown polymer on the surface, thereby improving safety due to the presence of the meltdown polymer, while maintaining battery capacity. Alternatively, forming the meltdown polymer on the whole surface of the active material layer of the electrode would relatively reduce an availability of the active material, and correspondingly reduce relative battery capacity.

In addition, even though the meltdown polymer is present as a needle or spine shape, when the needle-shaped meltdown polymer substantially contacts horizontally with the surface of the active material in a length direction, the needle-shaped meltdown polymer is partly agglomerated and falls to obtain a desired effect. In addition, as the meltdown polymer is horizontally present and thus covers all the surface of the active material, the desired effect may be obtained.

The meltdown polymer may be a polymer that may be melted down at a temperature, for example of about 110° C. to about 140° C., which may occur during charge and discharge. For example, the meltdown polymer may be polyethylene, polypropylene, polymethyl methacrylate, poly(1-butene), polyimide, or a combination thereof having a melting point of about 110° C. to about 140° C. In one exemplary embodiment, the meltdown polymer is polyethylene. If the melting point is lower than about 110° C., the electrode manufactured using it may be damaged, while if the melting point is higher than about 140° C., the separator could shut down first, and thus an effect of the meltdown polymer may not be obtained.

Figure 2C:
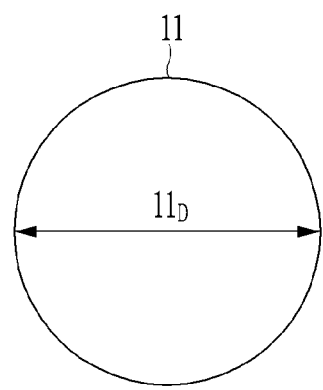
FIG. 2C is a cross-sectional, elevational view showing a spherical meltdown polymer according to a further exemplary embodiment.
Figure 2D:
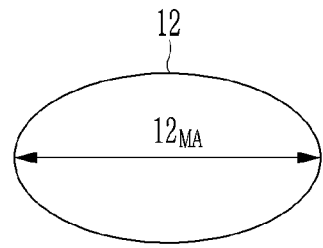
FIG. 2D is a cross-sectional, elevational view showing an oval meltdown polymer according to yet a further exemplary embodiment.
Figure 2E:
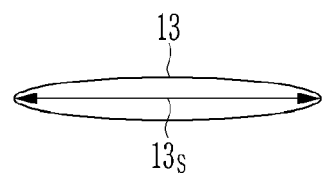
FIG. 2E is a top, plan view showing a plate-shaped meltdown polymer according to another exemplary embodiment.

When the meltdown polymer has a particle shape, its size, that is, its longest length, for example, when it is a sphere meltdown polymer particle 11, as depicted in FIG. 2C, it has a diameter $11_D$, or when it is an oval-shaped meltdown polymer particle 12, as depicted in FIG. 2D, a major axis length $12_{MA}$ may be about 1 µm to about 10 µm, or about 2 µm to about 5 µm. When the meltdown polymer has a plate shape 13, as depicted in FIG. 2E, its size may be measured by the longest length of its sides $13_S$. The length of the meltdown polymer may be adjusted within a range to have an aspect ratio of less than about 2 with consideration of its thickness range. When the meltdown polymer size is included within the range, the lithium ion movement may smoothly occur from the active material during the charge and discharge, and accordingly, an excellent lithium ion utilization rate may be obtained.

In an embodiment, when the meltdown polymer has a needle shape, the meltdown polymer may have a length of about 0.5 µm to about 10 µm or about 1 µm to about 5 µm. When the meltdown polymer has a length within the range, conductivity between the active materials may be maintained, the lithium ion movement from the active material may smoothly occur during the discharge, and accordingly, an excellent lithium ion utilization rate may be obtained.

Whether or not the meltdown polymer is present as a needle shape may be examined by using a scanning electron microscope (SEM), and when a ratio of a contact area of the meltdown polymer with the surface of the active material and a thickness of the meltdown polymer is greater than or equal to about 1:2, the meltdown polymer is regarded to be the needle shape. In addition, a particle size and a needle length of the meltdown polymer all may be measured by using SEM. The measurement with SEM is well known in the related art.

The meltdown polymer may be used in an amount of about 0.1 wt % to about 5.5 wt % or about 0.2 wt % to about 3.0 wt % based on a total weight of the second active material. When the amount of the meltdown polymer is included within the range, lithium mobility and simultaneously, excellent battery safety may be secured. When the amount of the meltdown polymer is smaller than the range, the battery safety improvement effect may be not obtained, but when the amount of the meltdown polymer is larger than the range, the lithium movement may be prevented, and thus capacity may not be realized.

An amount of the second active material including an active material having the meltdown polymer on the surface, may be about 95 wt % to about 99 wt % based on a total amount of the second active material layer. The second active material layer may further include a binder or optionally, a conductive material along with the second active material.

Herein, the amount of the meltdown polymer may be about 0.1 wt % to about 5.5 wt % based on the total amount of the second active material as aforementioned, and the second active material including the meltdown polymer on the surface of the active material may be about 95 wt % to about 99 wt % based on a total amount of the second active material layer, and the binder may be included in an amount of about 1 wt % to about 5 wt %. In addition, when the second active material layer further includes the conductive material, the second active material may be used in a range of about 90 wt % to about 98 wt %, the binder may be about 1 wt % to about 5 wt %, and the conductive material may be about 1 wt % to about 5 wt % based on a total amount of the second active material layer.

This meltdown polymer is adhered on the surface of the active material through the binder for a meltdown polymer, that is, disposed on the surface of the active material by using the binder for a meltdown polymer. As the meltdown polymer is adhered on the surface of the active material by using the binder for a meltdown polymer, the meltdown polymer and the active material may be bound through a strong bonding force, and accordingly, since the meltdown polymer is not detached from the surface of the active material but firmly present during manufacture of the electrode, an effect of using the meltdown polymer may be obtained.

When the meltdown polymer is mixed, that is, physically combined with the active material, the meltdown polymer may be easily detached during manufacture of the electrode from the surface of the active material and thus bring about no effect of the meltdown polymer.

The binder for a meltdown polymer may be any binder for a positive electrode or a negative electrode, when the meltdown polymer has particle shapes. Furthermore, when the meltdown polymer has particle shapes, an amphiphilic binder such as a styrene-acrylate copolymer may be used. In addition, when the meltdown polymer forms spines, an amphiphilic binder may be used, for example, a styrene-acrylate copolymer and the like may be used but is not limited thereto and may include any amphiphilic binder capable of attaching the meltdown polymer to the surface of the active material.

In addition, the binder for a meltdown polymer may be used in an amount of about 0.05 wt % to about 3 wt % or about 0.1 wt % to about 3 wt % based on a total weight of the second active material. When the binder for a meltdown polymer is used within the range, the meltdown polymer may be better attached to the surface of the active material without increasing resistance.

A percent area of the meltdown polymer on the surface of the active material may be about 0.1% to about 80% based on 100% of the surface area of the active material. When the meltdown polymer is present within the desired percent area range on the surface of the active material, as excellent shutdown performance is realized in a state of securing mobility of lithium ions, battery safety may be obtained.

A thickness of the second active material layer may be in a range of about 2 µm to about 8 µm. In addition, the thickness of the second active material layer may be about 0.1% to about 30% or about 1% to about 10% based on 100% of a sum thickness of the first active material layer and the second active material layer. In this way, the thickness of the second active material layer may be included within a range of about 2 µm to about 8 µm, which may take about 0.1% to about 30%, or even about 1% to about 10%, based on 100% of the total thickness sum of the first active material layer and the second active material layer. In addition, when the second active material layer has a thickness within the range, optimal performance may be realized, and also, safety may be secured.

The electrode may be either a negative electrode or a positive electrode, and according to an embodiment, a negative electrode. When the electrode is a negative electrode, the first active material is a negative active material, and the active material is also a negative active material.

Herein, as the negative active material, a material that reversibly intercalates/deintercalates lithium ions, such as, a lithium metal, a lithium metal alloy, a material capable of doping/dedoping lithium, or transition metal oxide, may be used. The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn. The transition metal oxide includes a lithium titanium oxide.

The material that reversibly intercalates/deintercalates lithium ions may include a carbon, silicon, or tin material, particularly include a carbon material, that is, a generally-used carbon-based negative active material in a rechargeable lithium battery. Examples of the carbon-based negative active material may include crystalline carbon, amorphous carbon, or mixtures thereof. The crystalline carbon may be shapeless (non-specified shape), or sheet, flake, spherical, or fiber shaped natural graphite or artificial graphite. The amorphous carbon may be a soft carbon, a hard carbon, a mesophase pitch carbonization product, and fired coke.

The material capable of doping/dedoping lithium may be a silicon or tin material, such as Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), and a Sn-carbon composite, and at least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The first active material and the active material may be the negative active material and they may be the same as or different. When the first active material is the same as the active material, the two first and second active material layers have similar lithium-moving characteristics based on a boundary thereof, and accordingly, an interface thereof may unlikely work as lithium-moving resistance. The first active material layer includes a binder and may further optionally include a conductive material.

When the electrode is a negative electrode, a content of the negative active material may be about 95 wt % to about 99 wt % based on a total amount of the first active material layer. A content of the binder in the first active material layer may be about 1 wt % to about 5 wt % based on a total amount of the first active material layer. In addition, when the conductive material is further included, about 90 wt % to about 98 wt % of the negative active material, about 1 to about 5 wt % of the binder, and about 1 wt % to about 5 wt % of the conductive material may be used based on a total amount of the first active material layer.

The binder improves binding properties of negative active material particles with one another and with a current collector. The binder includes a non-water-soluble binder, a water-soluble binder, or a combination thereof.

The non-water-soluble binder may be selected from a styrene-butadiene rubber, an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamide-imide, polyimide, or a combination thereof.

The water-soluble binder may be an acrylated styrene-butadiene rubber, an acrylonitrile-butadiene rubber, an acrylic rubber, a butyl rubber, a fluorine rubber, an ethylene oxide-containing polymer, polyvinylpyrrolidone, polyepichlorohydrin, polyphosphazene, an ethylenepropylene copolymer, polyvinylpyridine, chlorosulfonated polyethylene, a latex, a polyester resin, an acrylic resin, a phenol resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be sodium, potassium, or lithium. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, a carbon black sold under the trade designation KETJENBLACK, a carbon black sold under the trade designation Denka Black® by Denka Company Limited of Tokyo, Japan, and a carbon fiber; a metal-based material of a metal powder or a metal fiber including copper, nickel, and aluminum silver; a conductive polymer such as a polyphenylene derivative; or a mixture thereof.

The second active material layer, like the first active material layer, may also include a binder, together with the second active material including the meltdown polymer bound particularly through the binder for a meltdown polymer on the surface of the active material and further a conductive material. Types of the binder and the conductive material may be the same as aforementioned. In the second active material layer, the binder may be used in an amount of about 1 wt % to about 5 wt %, based on the total weight of the second active material layer, and the conductive material may be used in an amount of about 1 wt % to about 5 wt %, based on the total weight of the second active material layer.

When the electrode is a negative electrode, the current collector may include one selected from a copper foil, a nickel foil, a stainless steel foil, a titanium foil, a nickel foam, a copper foam, a polymer substrate coated with a conductive metal, and a combination thereof.

When the electrode is a positive electrode, the first active material is a positive active material, and the active material is also a positive active material.

The positive active material may include a compound (lithiated intercalation compound) capable of intercalating and deintercallating lithium ions, and specifically one or more composite oxides of a metal selected from cobalt, manganese, nickel, and a combination thereof, and lithium. As specific examples, compounds represented by one of chemical formulae may be used. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.5, 0<α<2); $Li_aNi_{1-b-c}Co_bX_cO_{2-\alpha}T_2$ (0.90≤a≤1.8, 0≤b≤0.5, 0≤c≤0.5, 0<α<2); $Li_aNi_{1-b-c}Mn_bX_cD_\alpha$ (0.90≤a≤1.8, 0≤b≤0.5, 0≤c≤0.5, 0<α≤2); $Li_aNi_{1-b-c}Mn_bX_cO_{2-\alpha}T_\alpha$ (0.90≤a≤1.8, 0≤b≤0.5, 0≤c≤0.5, 0<α<2); $Li_aNi_{1-b-c}Mn_bX_cO_{2-\alpha}T_2$ (0.90≤a≤1.8, $0 \leq b \leq 0.5$, $0 \leq c \leq 0.5$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compound may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound. As an example, the method may include any coating method (e.g., spray coating, dipping, etc.), but is not illustrated in more detail since it is well-known to those skilled in the related field.

The first active material and the active material may be the positive active material and they may be the same or different. When the first active material and the active material are the same, as the first and second active material layers have similar lithium moving characteristics based on a boundary thereof, an interface thereof may unlikely work as lithium moving resistance.

When the electrode is a positive electrode, an amount of the positive active material may be about 90 wt % to about 98 wt % based on a total amount of the first active material layer.

The first active material layer may further include a binder and a conductive material. Herein, each amount of the binder and the conductive material may be about 1 wt % to about 5 wt % based on the total weight of the first active material layer.

The binder improves binding properties of positive active material particles with one another and with a current collector, and examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and a nylon, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, a carbon black sold under the trade designation KETJENBLACK, and a carbon fiber; a metal-based material of a metal powder or a metal fiber including copper, nickel, aluminum, and silver; a conductive polymer such as a polyphenylene derivative; or a mixture thereof.

The second active material layer, like the first active material layer, may also include a binder along with the second active material including the meltdown polymer particularly bound through the binder on the surface of the active material and may further include a conductive material. Types of the binder and the conductive material are the same as aforementioned. In the second active material layer, the binder may be used in an amount of about 1 wt % to about 5 wt % based on the total weight of the second active material layer, and the conductive material may be used in an amount of about 1 wt % to about 5 wt % based on the total weight of the second active material layer.

When the electrode is a positive electrode, the current collector may be an aluminum foil, a nickel foil, or a combination thereof, but is not limited thereto. The electrode for a rechargeable lithium battery according to an embodiment may be manufactured by coating a first active material layer composition on a current collector to form a first active material layer and then, a second active material layer composition on the first active material layer to form a second active material layer.

The first active material layer composition may be prepared by mixing the active material, the binder, and optionally, the conductive material in a first solvent. A method of forming the first active material layer and the second active material layer is well known in the related art and thus will not be illustrated in detail in the present disclosure. The first solvent may be N-methylpyrrolidone or water, but is not limited thereto. In addition, when the first active material layer is a negative active material layer, and the water-soluble binder is used for the negative active material layer, a solvent for preparing a negative active material composition may be water.

The second active material layer composition may be prepared by mixing the second active material including an active material and a meltdown polymer on the surface of the active material, a binder, and optionally, a conductive material in a second solvent, such as N-methylpyrrolidone or water, or adding the binder and optionally, the conductive material to a mixed solution including the second active material without removing a solvent during the process of preparing the second active material. When the mixed solution including the second active material is used, an additional solvent may not be used. The second active material may be prepared by mixing the active material, the binder for a meltdown polymer, and the meltdown polymer. Particularly, the second active material may be obtained by first mixing the meltdown polymer and the binder for a meltdown polymer to bind the meltdown polymer with the binder for the meltdown polymer and then, adding the active material thereto. Herein, when the meltdown polymer has particle shapes, the meltdown polymer is disposed in lumps on the surface of the active material, but when the meltdown polymer has a needle or spine shape, the meltdown polymer is adhered on the surface of the active material and thus forms with the active material spiny spheres.

When an amount of the binder for a meltdown polymer is adjusted, the meltdown polymer may be disposed as a cluster of lumps on the surface of the active material, for example, when the binder for the meltdown polymer is used in an amount of about 1 wt % to about 50 wt % based on 100 wt % of the active material, the meltdown polymer may be disposed as lumps on the surface of the active material.

The active material, the binder for a meltdown polymer, and the meltdown polymer may mixed in a weight ratio of about 99.8:0.1:0.1 per 100 to about 92:3:5 per 100 parts of the combined mixture. When the active material, the binder for a meltdown polymer, and the meltdown polymer are mixed within the range, battery performance may be realized by securing mobility of lithium ions, and battery safety may be realized by using the shutdown property of the meltdown polymer.

In this way, when the meltdown polymer is firstly mixed with the binder for a meltdown polymer, and then, the active material is added thereto, thereby obtaining the meltdown polymer disposed on the surface of the active material in a vertical direction as a length direction, that is, in the shape of spiny spheres, a desired effect may be appropriately obtained. However, when the active material, the binder for a meltdown polymer, and the meltdown polymer are mixed in a solvent at one time, or even though the needle-type meltdown polymer is used, the active material, the meltdown polymer, the binder, and optionally, the conductive material are mixed to prepare active material slurry, and the slurry is used to manufacture an electrode. If the needle-shaped meltdown polymer is not well dispersed but easily gathered, that is, agglomerated and resultantly, becomes sticky and is not prepared into slurry. Thus, the meltdown polymer may not be coated on a current collector and fail in being manufactured into the electrode.

Another embodiment provides a rechargeable lithium battery including the first electrode, the second electrode, and the electrolyte. The first electrode may be a negative electrode, the second electrode may be a positive electrode, the first electrode may be a positive electrode, and the second electrode may be a negative electrode. The electrolyte includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of the ester-based solvent are methyl acetate, ethyl acetate, n-propyl acetate, t-butyl acetate, methylpropionate, ethylpropionate, propylpropionate, γ-butyrolactone, decanolide, valerolactone, mevalonolactone, and caprolactone.

The ether-based solvent may include dibutyl ether, tetraglyme, diglyme, dimethoxyethane, 2-methyltetrahydrofuran, and tetrahydrofuran and the ketone-based solvent may include cyclohexanone.

The alcohol-based solvent may include ethanol and isopropyl alcohol, and the aprotic solvent may include nitriles such as T-CN (wherein T is a hydrocarbon group having a C2 to C20 linear, branched, or cyclic hydrocarbon group and may include a double bond, an aromatic ring, or an ether bond), dioxolanes such as 1,3-dioxolane, and sulfolanes.

The non-aqueous organic solvent may be used alone or in a mixture. When the organic solvent is used in a mixture, the mixture ratio may be controlled in accordance with a desirable battery performance.

The carbonate-based solvent is prepared by mixing a cyclic carbonate and a linear carbonate. When the cyclic carbonate and linear carbonate are mixed together in a volume ratio of 1:1 to 1:9, a performance of an electrolyte may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Formula 1.

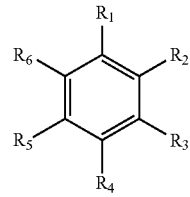

[Formula 1]

In Formula 1, R1 to R6 may be the same or different, and are, independently, hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte of a rechargeable lithium battery may further include an ethylene carbonate-based compound represented by Formula 2 in order to improve a battery cycle-life.

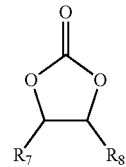

[Formula 2]

In Formula 2, R7 and R8 may each, independently, be hydrogen, a halogen, a cyano group (CN), a nitro group ($NO_2$), and a C1 to C5 fluoroalkyl group, provided that at least one of R7 and R8 is selected from a halogen, a cyano group (CN), a nitro group ($NO_2$), and a C1 to C5 fluoroalkyl group, and R7 and R8 are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. When such an additive for improving cycle-life is further used, the amount may be controlled within an appropriate range.

The lithium salt dissolved in an organic solvent supplies lithium ions in a battery, enables a basic operation of a rechargeable lithium battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis (fluorosulfonyl)imide: LiFSI), $LiC_4F_9SO_3$, $LiCO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20, LiCl, LiI, and $LiB(C_2O_4)_2$ (lithium bis(oxalato) borate: LiBOB). The lithium salt may be used in a concentration ranging from about 0.1 M to about 2.0 M. When the lithium salt is included at the above concentration range, an electrolyte may have excellent performance and lithium ion mobility due to desired electrolyte conductivity and viscosity.

In addition, a separator may be disposed between the positive electrode and the negative electrode depending on a type of the rechargeable lithium battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

Figure 3:
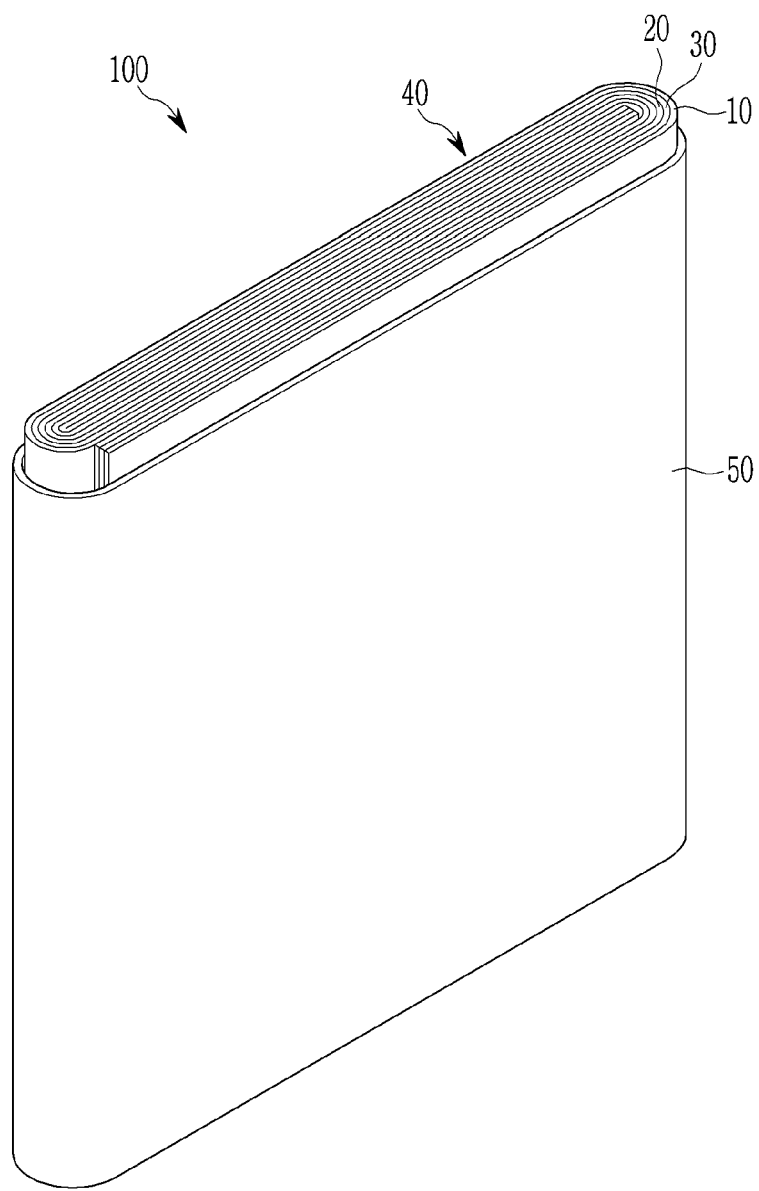
FIG. 3 is a cut-away, perspective view showing a structure of a rechargeable lithium battery according to an exemplary embodiment.

FIG. 3 is a cut-away perspective view of a rechargeable lithium battery according to an embodiment. The rechargeable lithium battery according to an embodiment is illustrated as a pouch-type battery but is not limited thereto and may include variously-shaped batteries such as a cylindrical battery, a prismatic battery, and the like.

Referring to FIG. 3, a rechargeable lithium pouch battery 100 according to an embodiment includes an electrode assembly 40 manufactured by winding a positive electrode 10, a negative electrode 20, and a separator 30 disposed therebetween, a case 50 including the electrode assembly 40, and an electrode tab (not shown) that provides an electrical path to externally draw currents generated in the electrode assembly 40. The case 50 is sealed by overlapping the two sides facing each other. In addition, an electrolyte solution is injected into the case 50 including the electrode assembly 40 and the positive electrode 10, the negative electrode 20, and the separator 30 are impregnated in the electrolyte solution (not shown).

Hereinafter, examples of the present invention and comparative examples are described. These examples, however, are not in any sense to be interpreted as limiting the scope of the invention.

EXAMPLE 1

95 wt % of a $LiCoO_2$ positive active material, 3 wt % of a polyvinylidene fluoride binder, and 2 wt % of a KETJEN-BLACK conductive material based on the total weight of the combination are mixed in an N-methylpyrrolidone solvent to prepare positive active material slurry. The positive active material slurry is coated on both surfaces of an aluminum current collector and then, is dried and compressed to manufacture a positive electrode having a positive active material layer.

A particle-shaped polyethylene meltdown polymer (an average size (a longest length): 1 μm, an aspect ratio: 1.9) and a styrene-acrylate copolymer binder are mixed in a water solvent, and an artificial graphite active material is added to this mixture to prepare a mixed solution. In this mixed solution, the meltdown polymer is disposed as lumps on the surface of the active material whose area was 10% based on 100% of a surface area of the active material and also present as particle shapes, resultantly preparing a second negative active material.

Herein, the particle-shaped polyethylene meltdown polymer, the styrene-acrylate copolymer binder, and the active material are used in each amount of 0.1 wt %, 0.1 wt %, and 99.8 wt % based on the total weight of the combined materials.

The mixed solution including the second negative active material, the styrene-butadiene rubber binder, and the carboxymethyl cellulose thickener are mixed by using the second negative active material, the styrene-butadiene rubber binder, and the carboxymethyl cellulose thickener in each amount of 95 wt %, 3 wt %, and 2 wt % based on the total weight of the combined materials to prepare second negative active material slurry.

On the other hand, first negative active material slurry is prepared by mixing 95 wt % of an artificial graphite negative active material, and 3 wt % of a styrene-butadiene rubber binder, and 2 wt % of a carboxymethyl cellulose thickener in a water solvent based on the total weight of the combined materials.

The first negative active material slurry is coated on a copper current collector and then, is dried to form a first negative active material layer, and the second negative active material slurry is coated on the first negative active material layer and then, is dried to form a second negative active material layer. Subsequently, a compression process is performed to manufacture a negative electrode having the first negative active material layer and the second negative active material layer sequentially formed on the current collector. The first negative active material layer has a thickness of 50 μm, the second negative active material layer has a thickness of 5 μm, and in the second negative active material layer, an amount of the meltdown polymer is 0.1 wt % based on 100 wt % of the entire amount of the second negative active material.

EXAMPLE 2

A positive electrode is manufactured according to the same method as that of Example 1.

The particle-shaped polyethylene meltdown polymer (an average size (a longest length): 2 μm, an aspect ratio: 1.9), the styrene-acrylate copolymer binder, and the active material are used in each amount of 1 wt %, 1 wt %, and 98 wt % based on the total weight of the combination according to the same method as Example 1 to prepare a second negative active material, wherein the meltdown polymer is disposed as lumps on the surface of the active material whose area is 30% based on 100% of the surface area of the active material and also, present as particle shapes.

95 wt % of the second negative active material, 3 wt % of the styrene-butadiene rubber binder, and 2 wt % of the carboxylmethyl cellulose thickener based on the total weight of the combination are mixed in a water solvent to prepare second negative active material slurry.

The second negative active material slurry is used according to the same method as that of Example 1 to manufacture a negative electrode. Herein, the obtained first negative active material layer has a thickness of 50 μm, the second negative active material layer has a thickness of 5 μm, and in the second negative active material layer, an amount of the meltdown polymer is 1 wt % based on 100 wt % of the entire amount of the second negative active material.

EXAMPLE 3

A positive electrode is manufactured according to the same method as that of Example 1.

The particle-shaped polyethylene meltdown polymer (an average size (a longest length): 5 μm, an aspect ratio: 1.9), the styrene-acrylate copolymer binder, and the active material are used in each amount of 3 wt %, 2 wt %, and 95 wt % based on the total weight of the combination according to the same method as that of Example 1 to prepare a second negative active material, wherein the meltdown polymer is disposed as lumps on the surface of the active material whose area was 60% based on 100% of the surface area of the active material and also, present as particle shapes.

95 wt % of the second negative active material, 3 wt % of the styrene-butadiene rubber binder, and 2 wt % of the carboxylmethyl cellulose thickener based on the total weight of the combination are mixed in a water solvent to prepare second negative active material slurry.

The second negative active material slurry is used according to the same method as that of Example 1 to manufacture a negative electrode. Herein, the obtained first negative active material layer has a thickness of 50 μm, the second negative active material layer has a thickness of 5 μm, and in the second negative active material layer, an amount of the meltdown polymer is about 3.2 wt % based on 100 wt % of the entire amount of the second negative active material.

EXAMPLE 4

A positive electrode is manufactured according to that of the same method as Example 1.

The particle-shaped polyethylene meltdown polymer (an average size (a longest length): 8 μm, an aspect ratio: 1.9), the styrene-acrylate copolymer binder, and the active material are used in each amount of 5 wt %, 3 wt %, and 92 wt % based on the total weight of the combination according to the same method as that of Example 1 to prepare a second negative active material, wherein the meltdown polymer is disposed as lumps on the surface of the active material whose area is 80% based on 100% the entire surface area of the active material and also, present as particle shapes.

A combination of 95 wt % of the second negative active material, 3 wt % of the styrene-butadiene rubber binder, and 2 wt % of the carboxylmethyl cellulose thickener based on the total weight of the combination is mixed in a water solvent to prepare second negative active material slurry.

The second negative active material slurry is used according to the same method as that of Example 1 to manufacture a negative electrode. Herein, the first negative active material layer has a thickness of 50 μm, a second negative active material layer has a thickness of 5 μm, and in the second negative active material layer, an amount of the meltdown polymer is about 5.4 wt % based on 100 wt % of the entire amount of the second negative active material.

Reference Example 1

The positive electrode is manufactured according to the same method as that of Example 1.

The particle-shaped polyethylene meltdown polymer (an average size (a longest length): 10 μm, an aspect ratio: 1.9), the styrene-acrylate copolymer binder, and the active material are used in each amount of 7 wt %, 4 wt %, and 89 wt % based on the total weight of the combination according to the same method as that of Example 1 to prepare a second negative active material, where the meltdown polymer is disposed as lumps on the surface of the active material whose area was 90% based on 100% the entire surface area of the active material and also, present as particle shapes.

A combination of 95 wt % of the second negative active material, 3 wt % of the styrene-butadiene rubber binder, and 2 wt % of the carboxylmethyl cellulose thickener based on the total weight of the combination are mixed in a water solvent to prepare second negative active material slurry.

The second negative active material slurry is used according to the same method as that of Example 1 to manufacture a negative electrode. Herein, the first negative active material layer has a thickness of 50 μm, a second negative active material layer has a thickness of 5 μm, and in the second negative active material layer, an amount of the meltdown polymer is about 7.9 wt % based on 100 wt % of the entire amount of the second negative active material.

Reference Example 2

A positive electrode is manufactured according to the same method as that of Example 1.

A negative electrode is manufactured according to the same method as that of Example 3 except that the second negative active material slurry of Example 3 is used to form a second negative active material layer having a thickness of 1 μm.

Herein, the first negative active material layer has a thickness of 50 μm, the second negative active material layer has a thickness of 1 μm, and in the second negative active material layer, an amount of the meltdown polymer is about 3.2 wt % based on 100 wt % of the entire amount of the second negative active material.

Reference Example 3

A positive electrode is manufactured according to the same method as that of Example 1.

A negative electrode is manufactured according to the same method as that of Example 3 except that the second negative active material slurry of Example 3 is used to form a second negative active material layer having a thickness of 10 μm.

Herein, the first negative active material layer has a thickness of 50 μm, the second negative active material layer has a thickness of 10 μm, and in the second negative active material layer, an amount of the meltdown polymer is about 3.2 wt % based on 100 wt % of the entire amount of the second negative active material.

Reference Example 4

A positive electrode is manufactured according to the same method as that of Example 1.

A negative electrode is manufactured according to the same method as that of Example 3 except that the second negative active material slurry of Example 3 is used to form a second negative active material layer having a thickness of 15 μm.

Herein, the first negative active material layer has a thickness of 50 μm, the second negative active material layer has a thickness of 15 μm, and in the second negative active material layer, an amount of the meltdown polymer is about 3.2 wt % based on 100 wt % of the entire amount of the second negative active material.

Battery Manufacture

The positive and negative electrodes according to Examples 1 to 4 and Reference Examples 1 to 4 are respectively used to manufacture rechargeable battery cells by disposing a separator between the positive and negative electrodes and using an electrolyte.

The electrolyte is prepared by using a mixed solvent of ethylene carbonate and diethyl carbonate in a ratio of 50:50, by volume, in which 1M $LiPF_6$ is dissolved, and as for the separator, a polyethylene film is used.

Evaluation of Battery Safety

The rechargeable lithium battery cells are respectively manufactured in sets of ten, and then, a penetration test of the battery cells is performed, and the results are shown in Table 1.

The penetration test is performed by charging the rechargeable lithium battery cells at 0.5 C up to 4.4 V for 3 hours, pausing the charge for about 10 minutes (may be performed for up to 72 hours), and then, completely penetrating a center of the battery cells with a pin having a diameter of 5 mm at 60 mm/sec.

Cycle-Life Characteristics Evaluation

The rechargeable lithium battery cells are charged at a constant current/constant voltage under a cut-off condition of 1.0 C, 4.4 V, and 0.1 C and paused for 5 minutes and then, are discharged at a constant current under a cut-off condition of 1.0 C and 3.0 V and are paused for 5 minutes at room temperature of 25° C., which is regarded as one charge and discharge cycle and repeated 300 times in total. Capacity retention depending on this charge and discharge cycle is calculated as a ratio of discharge capacity at each cycle relative to discharge capacity at the first cycle, and the results are shown in Table 1.

TABLE 1

| | Safety (Penetration) | Capacity Retention (%) |
|---|---|---|
| Example 1 | L2 = 10 cells | 85% |
| Example 2 | L1 = 4 cells, L2 = 6 cells | 85% |
| Example 3 | L1 = 8 cells, L2 = 2 cells | 85% |
| Example 4 | L1 = 10 cells | 85% |
| Reference Example 1 | L1 = 10 cells | 80% |
| Reference Example 2 | L2 = 2 cells, L4 = 8 cells | 85% |
| Reference Example 3 | L2 = 10 cells | 78% |
| Reference Example 4 | L2 = 10 cells | 60% |

In Table 1, LX represents battery safety with X being a variable ranging from 0 to 5, and a smaller value for X indicates a safer battery cell. The results depending on X are as follow.

L0: no change
L2: leakage
L2: smoke
L4: exothermic at 200° C.
L5: explosion

As shown in Table 1, the battery cells according to Examples 1 to 4 exhibit excellent or similar safety to those of Reference Examples 1 to 4 and also excellent capacity retention as compared with those of Reference Examples 1 to 4.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electrode for a rechargeable lithium battery, comprising:
    a current collector;
    a first active material layer formed on the current collector and including a first active material; and
    a second active material layer formed on the first active material layer wherein the second active material layer includes a second active material including an active material and a meltdown polymer disposed on a surface of the active material,
    wherein the meltdown polymer is disposed on the surface of the active material with an area of about 0.1% to about 80% relative to 100% of a surface area of the active material,
    wherein the meltdown polymer is disposed in a shape of a plurality of spines attached to the surface of the active material.

2. An electrode for a rechargeable lithium battery, comprising
    a current collector;
    a first active material layer formed on the current collector and including a first active material; and
    a second active material layer formed on the first active material layer wherein the second active material layer includes a second active material including an active material and a meltdown polymer disposed on a surface of the active material,
    wherein the meltdown polymer is disposed on the surface of the active material with an area of about 0.1% to about 80% relative to 100% of a surface area of the active material,
    wherein a thickness of the second active material layer is about 2 μm to about 8 μm, and
    wherein the meltdown polymer comprises a plurality of spines and a length of each spine of the meltdown polymer is about 0.5 μM to about 10 μm.

3. The electrode of claim 2, wherein the meltdown polymer is disposed in a cluster of lumps on the surface of the active material.

4. The electrode of claim 2, wherein the meltdown polymer comprises polyethylene, polypropylene, polymethylmethacrylate, poly(1-butene), polyimide, or a combination thereof.

5. The electrode of claim 2, wherein the meltdown polymer comprises polyethylene.

6. The electrode of claim 2, wherein the meltdown polymer is present in an amount of about 0.1 wt % to about 5.5 wt % based on a total weight of the second active material.

7. The electrode of claim 2, wherein the meltdown polymer is attached to the surface of the active material via a binder.

8. The electrode of claim 2, wherein the meltdown polymer comprises a plurality of particles and each particle of the meltdown polymer has a major axis length of about 1 μm to about 10 μm.

9. The electrode of claim 2, wherein a thickness of the second active material layer is about 0.1% to about 30% relative to 100% of the entire thickness of the first active material layer and the second active material layer.

10. The electrode of claim 2, wherein the electrode is a positive electrode or a negative electrode.

11. The electrode of claim 2, wherein the electrode is a negative electrode.

12. The electrode of claim 2, wherein the first active material and the active material are the same.

13. The electrode of claim 2, wherein the active material is a positive active material comprising a lithiated intercalation compound.

14. The electrode of claim 13, wherein the lithiated intercalation compound comprises $LiCoO_2$.

15. The electrode of claim 2, wherein the active material is a negative active material comprising graphite.

16. A rechargeable lithium battery comprising:
a first electrode according to the electrode of claim 2;
a second electrode; and
an electrolyte.

* * * * *